(12) United States Patent
Kimata

(10) Patent No.: US 9,218,210 B2
(45) Date of Patent: Dec. 22, 2015

(54) DISTRIBUTED PROCESSING SYSTEM

(71) Applicant: NEC Corporation, Minato-ku, Tokyo (JP)

(72) Inventor: Isao Kimata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 93 days.

(21) Appl. No.: 14/227,441

(22) Filed: Mar. 27, 2014

(65) Prior Publication Data

US 2014/0298350 A1 Oct. 2, 2014

(30) Foreign Application Priority Data

Mar. 27, 2013 (JP) .................................. 2013-066711

(51) Int. Cl.
*G06F 9/46* (2006.01)
*G06F 9/50* (2006.01)

(52) U.S. Cl.
CPC .................................... *G06F 9/5027* (2013.01)

(58) Field of Classification Search
CPC .................................................... G06F 9/5027
See application file for complete search history.

(56) References Cited

U.S. PATENT DOCUMENTS

| | | | | |
|---|---|---|---|---|
| 2013/0247050 | A1* | 9/2013 | Watanabe | 718/101 |
| 2013/0332932 | A1* | 12/2013 | Teruya et al. | 718/102 |
| 2014/0215487 | A1* | 7/2014 | Cherkasova et al. | 718/106 |
| 2014/0282588 | A1* | 9/2014 | Suzuki et al. | 718/104 |
| 2014/0298350 | A1* | 10/2014 | Kimata | 718/104 |
| 2015/0026693 | A1* | 1/2015 | Satoh et al. | 718/103 |

FOREIGN PATENT DOCUMENTS

| | | |
|---|---|---|
| JP | 9-282192 A | 10/1997 |
| JP | 10-326201 A | 12/1998 |

* cited by examiner

*Primary Examiner* — Philip Wang

(57) ABSTRACT

A management node includes a distributed task management unit that divides a task including a plurality of processing targets and allocates the task to a plurality of execution nodes, and an execution status information memory update unit that updates execution status information of the task in accordance with execution status update requests from the execution nodes. Based on a first period of time required for processing the processing targets of a unit amount by the execution node and a second period of time required for processing the execution status update request by the management node, the distributed task management unit determines the amount of the task allocated to each of the execution nodes such that a difference in the completion time of the task allocated to any two execution nodes, among the execution nodes, becomes greater than the second period of time.

12 Claims, 14 Drawing Sheets

DISTRIBUTED PROCESSING SYSTEM

INCORPORATION BY REFERENCE

The present application is based upon and claims the benefit of priority from Japanese patent application No. 2013-066711, filed on Mar. 27, 2013, the disclosure of which is incorporated herein in its entirety by reference.

TECHNICAL FIELD

The present invention relates to a distributed processing system, a distributed processing method, a node device, a control method implemented by a node device, and a program.

BACKGROUND ART

Batch processing is one type of data processing method of a computer. In batch processing, data is gathered for a certain period of time or by a certain amount, and is processed collectively as one task. As a large amount of data is processed collectively, when the processing is terminated abnormally in the middle of the processing, the cost tends to be higher if the processing is re-executed from the beginning. As such, a system has been proposed and put into practice use, in which the execution status of a task is stored in a storage device from time to time, and if the processing is terminated abnormally, the processing is re-executed from the middle of the task (for example, see JP 9-282192 A (Patent Document 1)).

In batch processing, simple processing is often executed repeatedly. In enterprise batch processing, for example, the same processing is performed on respective input item (data) strings, and the results are output. As such, there is a form in which task processing is performed in a distributed manner using a plurality of nodes (computers) (for example, see JP 10-326201 A (Patent Document 2)). Such a processing form is called distributed task processing, or simply called distributed processing, and a system executing it is called a distributed processing system. In a distributed processing system, execution statuses of a task in the respective nodes are often collected, stored, and managed in a persistent storage device in preparation for recovery processing or the like.

Patent Document 1: JP 9-282192 A
Patent Document 2: JP 10-326201 A

Here, consideration is given to a distributed processing system which is configured of a management node and a plurality of execution nodes as shown in FIG. 12, in which execution statuses of a task are collectively managed in a persistent storage device (execution status persistent storage device) of the management node. In this distributed management system, the management node divides an input task and allocates to the respective execution nodes. Each of the execution nodes executes the allocated task, and upon completion of the execution, transmits an execution status update request to the management node. In accordance with the received execution status update request, the management node updates the execution status information of the task stored in the persistent storage device. Thereby, the execution statuses of the task executed by a plurality of execution nodes are stored in the persistent storage device, and can be stored persistently as consistent information.

In the distributed management system as described above, if the respective execution nodes have the same processing performance, when the management node divides the input task equally and allocates to the respective execution nodes as shown in FIG. 13, the respective execution nodes complete execution of the task at almost the same time. It should be noted that in FIG. 13, small rectangle pieces show items to be processed. Accordingly, as shown in FIG. 14, there is a case where all of the execution nodes transmit execution status update requests to the management node at almost the same time, whereby a large number of execution status update requests arrive at the management node at once. As such, in the management node having a limitation in the number of execution status update requests which can be processed simultaneously, it is impossible to receive and process all of the execution status update requests. Thus, it is difficult to perform coherent execution status update processing, which brings difficulty in storing task execution statuses in a concentrated and consistent manner.

SUMMARY

An exemplary object of the present invention is to provide a distributed processing system capable of solving the above-described problem, that is, a problem that execution status update requests from a number of execution nodes are concentrated on the management node at a time.

A distributed processing system, according to a first exemplary aspect of the present invention, is a distributed processing system including a management node and a plurality of execution nodes.

The management node includes a persistent storage device that stores execution status information of a task configured of a plurality of units of processing target data;

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner.

When allocating, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

A node device, according to a second exemplary aspect of the present invention, is a node device connected with a plurality of execution nodes. The node device includes a persistent storage device that stores execution status information of a task configured of a plurality of units of processing target data;

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner.

When allocating, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

A distributed processing method, according to a third exemplary aspect of the present invention, is a distributed processing method implemented by a distributed processing system including a management node and a plurality of execution nodes, the management node including a persistent storage device that stores execution status information of a task configured of a plurality of units of processing target data. The method includes by the management node, allocating the units of processing target data to the execution nodes in a distributed manner;

by each of the execution nodes, transmitting an execution status update request including an execution result upon completion of processing executed to the units of processing target data allocated to the own node; and by the management node, receiving the execution status update request and updating the execution status information stored in the persistent storage device.

The allocating by the management node includes, based on a first period of time required for processing the units of processing target data by each of the execution nodes and a second period of time required for processing the execution status update request by the management node, determining the number of the units of processing target data allocated to each of the execution nodes such that in at least two execution nodes among the execution nodes, a difference in processing time required for processing the units of processing target data allocated to the two execution nodes becomes greater than the second period of time.

A control method, according to a fourth exemplary embodiment of the present invention, is a control method implemented by a node device which is connected with a plurality of execution nodes, the node device including a persistent storage device that stores execution status information of a task configured of a plurality of units of processing target data. The method includes allocating the units of processing target data to the execution nodes in a distributed manner, and receiving an execution status update request including an execution result regarding the units of processing target data from each of the execution nodes, and updating the execution status information stored in the persistent storage device.

The allocating includes, based on a first period of time required for processing the units of processing target data by each of the execution nodes and a second period of time required for processing the execution status update request by the management node, determining the number of the units of processing target data allocated to each of the execution nodes such that in at least two execution nodes among the execution nodes, a difference in processing time required for processing the units of processing target data allocated to the two execution nodes becomes greater than the second period of time.

A program, according to a fifth exemplary aspect of the present invention, is a program for causing a computer to function as, the computer being connected with a plurality of execution nodes and including a persistent storage device that stores execution status information of a task configured of a plurality of units of processing target data, an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner.

When allocating, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

As the present invention has the configurations described above, execution status update requests will not be transmitted from a number of execution nodes to the management node at the same time, whereby it is possible to temporally distribute the load on the management node associated with the execution status update requests.

EXEMPLARY EMBODIMENTS

Next, exemplary embodiments of the present invention will be described in detail with reference to the drawings.

First Exemplary Embodiment

Figure 1:
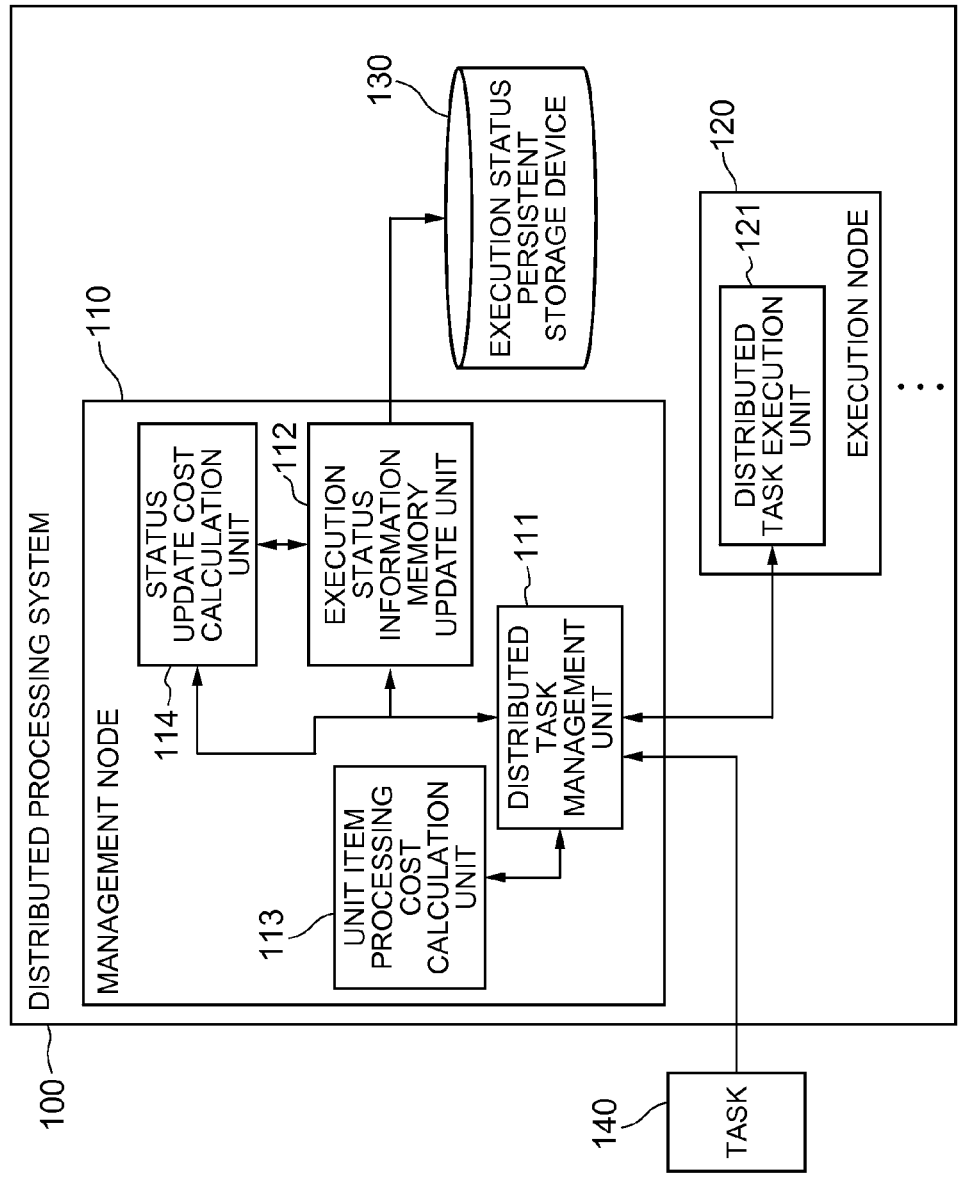
FIG. 1 is a block diagram showing a first exemplary embodiment of the present invention.

Referring to FIG. 1, a distributed processing system 100 according to a first exemplary embodiment of the present invention includes a management node 110, a plurality of execution nodes 120, and an execution status persistent storage device 130. In general, the management node 110 and the respective execution nodes 120 are connected over a network.

The execution status persistent storage device 130 is a persistent storage device such as a hard disk, and has a function of storing execution status information of a task. The execution status information of a task is configured of a combination of an identification name specifying the task, an identification name specifying the items (processing target data) constituting the task, and the execution statuses (e.g., executed, unexecuted) of the items, for example. Of course, the form of the execution status information of a task is not limited to the example described above. Another form in which an execution status is stored in units of a plurality of items, for example, may be acceptable. The execution status persistent storage device 130 may be a local storage device of the management node 110, or a storage device connected with the management node 110 over a network.

The management node 110 is configured of a computer including a processor such as an MPU, a memory unit such as a ROM and RAM, a communication unit such as a network interface card, an operation input unit such as a keyboard, and a screen display unit such as a liquid crystal display, for example. The memory unit has a program stored therein, and the processor reads and executes the program so as to allow the hardware and the program to cooperate with each other to implement the various processing units. The main processing units implemented by the processor include a distributed task management unit 111, an execution status information memory update unit 112, a unit item processing cost calculation unit 113, and a status update cost calculation unit 114.

The execution status information memory update unit 112 receives an execution status update request from the execution node 120 via the distributed task management unit 111, and in accordance with the execution status update request, updates execution status information stored in the execution status persistent storage device 130. For example, an execution status update request includes a task identifier, an item identifier, and an execution status. The execution status information memory update unit 112 updates execution status information in the execution status persistent storage device 130 corresponding to the task identifier and the item identifier included in the execution status update request, according to the execution status in the execution status information.

The status update cost calculation unit 114 has a function of calculating a time $t_{ex\text{-}update}$ required for processing an execution status update request of the number of units by the execution status information memory update unit 112, and providing the distributed task management unit 111 with it. The number of units may be one, for example. Any method of calculating the time $t_{ex\text{-}update}$ may be used. For example, a method based on a value set by a user, or a method in which the execution status information memory update unit 112 is allowed to execute an execution status update request of the number of units as a test, and the execution time thereof is obtained and stored, may be used.

The unit item processing cost calculation unit 113 has a function of calculating a time $t_{item}$ required for processing an item of a unit amount by the execution node 120, and providing the distributed task management unit 111 with it. The unit amount may be one item, for example. Any method of calculating the time $t_{item}$ may be used. For example, a method based on a value set by a user, or a method in which a distributed task execution unit, described below, of the execution node 120 is allowed to execute an item of a unit amount, and the execution time is obtained and stored, may be used.

The distributed task management unit 111 has a function of dividing a task 140 submitted to the management node 110 and allocating it to the execution nodes 120, and requesting the execution nodes 120 to execute the distributed task. The distributed task management unit 111 also has a function of, when receiving an execution status update request from any of the execution nodes 120, transmitting the request to the execution status information memory update unit 112 and requesting for processing. Further, when allocating the task, the distributed task management unit 111 has a function of acquiring a time $t_{item}$ from the unit item processing cost calculation unit 113, acquiring a time $t_{ex\text{-}update}$ from the status update cost calculation unit 114, and based on these times, determining the amounts of items to be processed in the task allocated to the respective execution nodes 120 such that a difference in the completion time of the task allocated to any two execution nodes, among the execution nodes 120, becomes greater than the time $t_{ex\text{-}update}$. Hereinafter, a specific example of a method of calculating the amount of items allocated to the respective execution nodes will be described.

First, the distributed task management unit 111 determines the number of unit items that the processing time thereof equals to the time $t_{ex\text{-}update}$, according to the following Expression 1. It should be noted that Δitem represents an integer obtained by rounding up the decimal places of $t_{ex\text{-}update}/t_{item}$.

$$\Delta\text{item} = t_{ex\text{-}update}/t_{item} \tag{1}$$

Next, assuming that the number of the execution nodes is "n", the total number of unit items which should be processed in the task is "m", and the node No. of each of the execution nodes is "i" (0≤i<n), the distributed task management unit 111 calculates the total amount N(i) to be allocated to an execution node of the node No. i, according to the following Expression 2.

$$N(i) = (m/n) + (i - n/2) * \Delta\text{item} \tag{2}$$

If the total amount of the item calculated according to Expression 2 exceeds "m", an adjustment is made to make the total amount "m", by reducing the excess items from one or more execution nodes having less allocated item.

The execution node 120 is configured of a computer including a processor such as an MPU, a memory unit such as a ROM and RAM, a communication unit such as a network interface card, an operation input unit such as a keyboard, and a screen display unit such as a liquid crystal display, for example. The memory unit has a program stored therein, and the processor reads and executes the program so as to allow the hardware and the program to cooperate with each other to implement the various processing units. The main processing units implemented by the processor include a distributed task execution unit 121.

The distributed task execution unit 121 has a function of executing a task allocated by the distributed task management unit 111 of the management node 110, and a function of transmitting an execution status update request, when the execution of the allocated task has been completed, to the distributed task management unit 111. The execution status update request includes a task identifier, an item identifier, and an execution status, for example.

Next, operation of the distributed processing system according to the present embodiment will be described.

In FIG. 1, when a task 140 is submitted, the distributed task management unit 111 of the management node 110 acquires the time $t_{item}$ required for processing a unit item from the unit item processing cost calculation unit 113, and acquires the time $t_{ex\text{-}update}$ required for processing the execution status update request of the number of units from the status update cost calculation unit 114. Then, based on the acquired $t_{item}$ and $t_{ex\text{-}update}$, the distributed task management unit 111 determines the amount of unit items which should be processed by the task allocated to each of the execution nodes 120 such that a difference in the completion time of the task allocated to any two execution nodes 120 becomes greater than $t_{ex\text{-}update}$. Specifically, the distributed task management unit 111 calculates the number of items to be allocated to each of the execution nodes 120 using Expression 1 and Expression 2. Then, the distributed task management unit 111 allocates processing for the calculated number of items to each execution node as a distributed task, and requests the distributed task execution unit 121 of each execution node to execute the distributed task.

Figure 2:
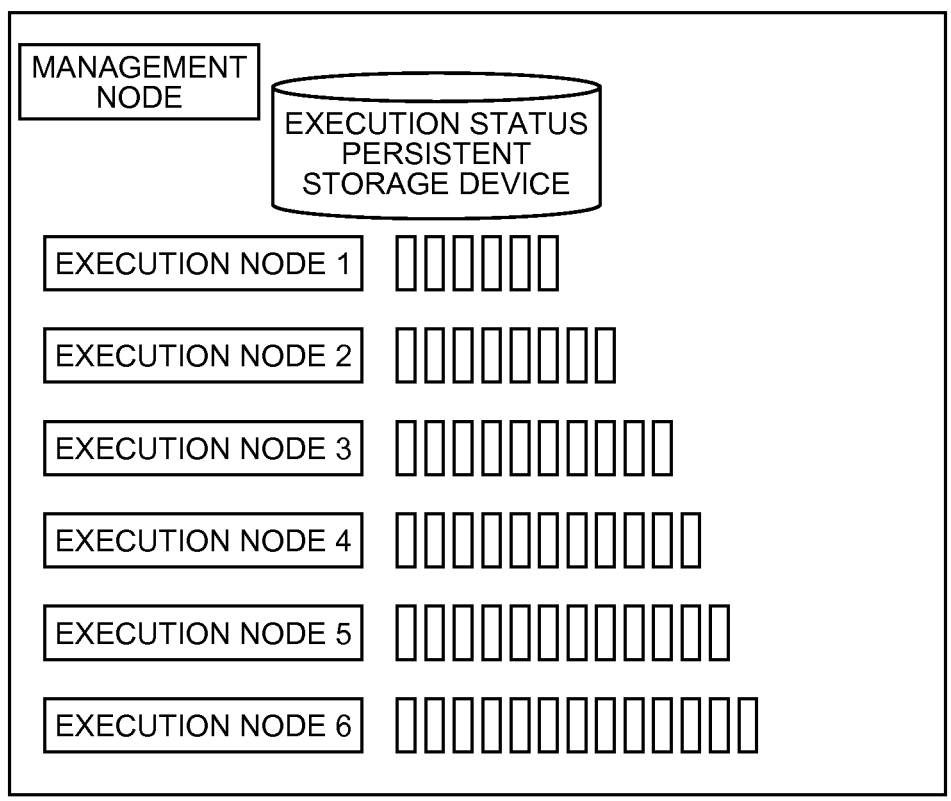
FIG. 2 shows an example of allocating a distributed task to execution nodes in the first exemplary embodiment of the present invention.

FIG. 2 shows an example of a distributed task allocation result of the case where the total number of the execution nodes 120 is 6, the number of items of the task 140 is 60, and the Δitem of Expression 1 is 1.

When the distributed task execution unit 121 of each of the execution nodes 120 is allocated a distributed task by the management node 110 and is requested to execute the distributed task, the distributed task execution unit 121 sequentially execute the respective items of the distributed task. Then, upon completion of processing of all of the items of the distributed task, the distributed task execution unit 121 transmits an execution status update request describing the completion, to the distributed task management unit 111 of the management node 110.

Figure 3:
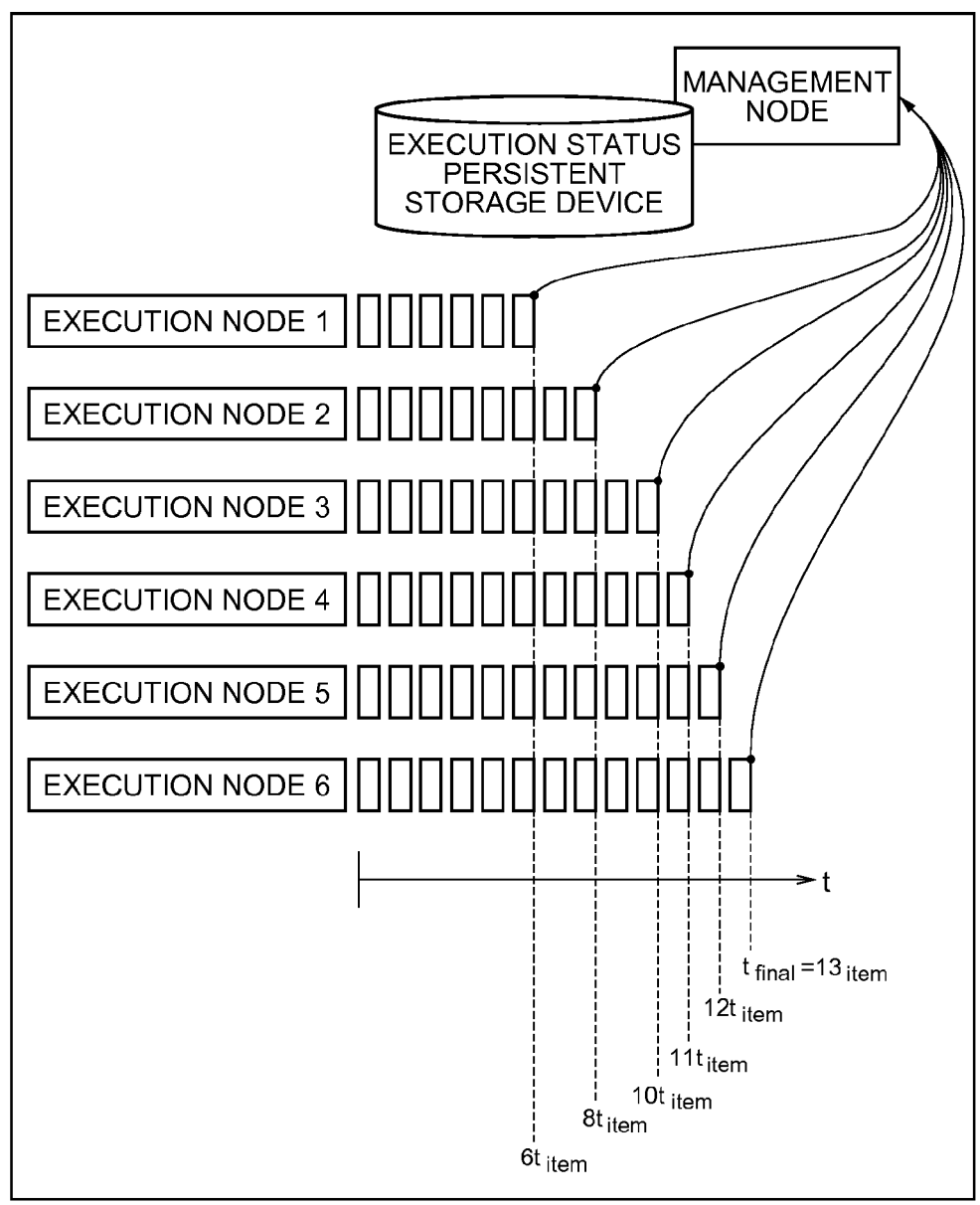
FIG. 3 illustrates the timing of execution status update requests transmitted from the execution nodes in the first exemplary embodiment of the present invention.
Figure 14:
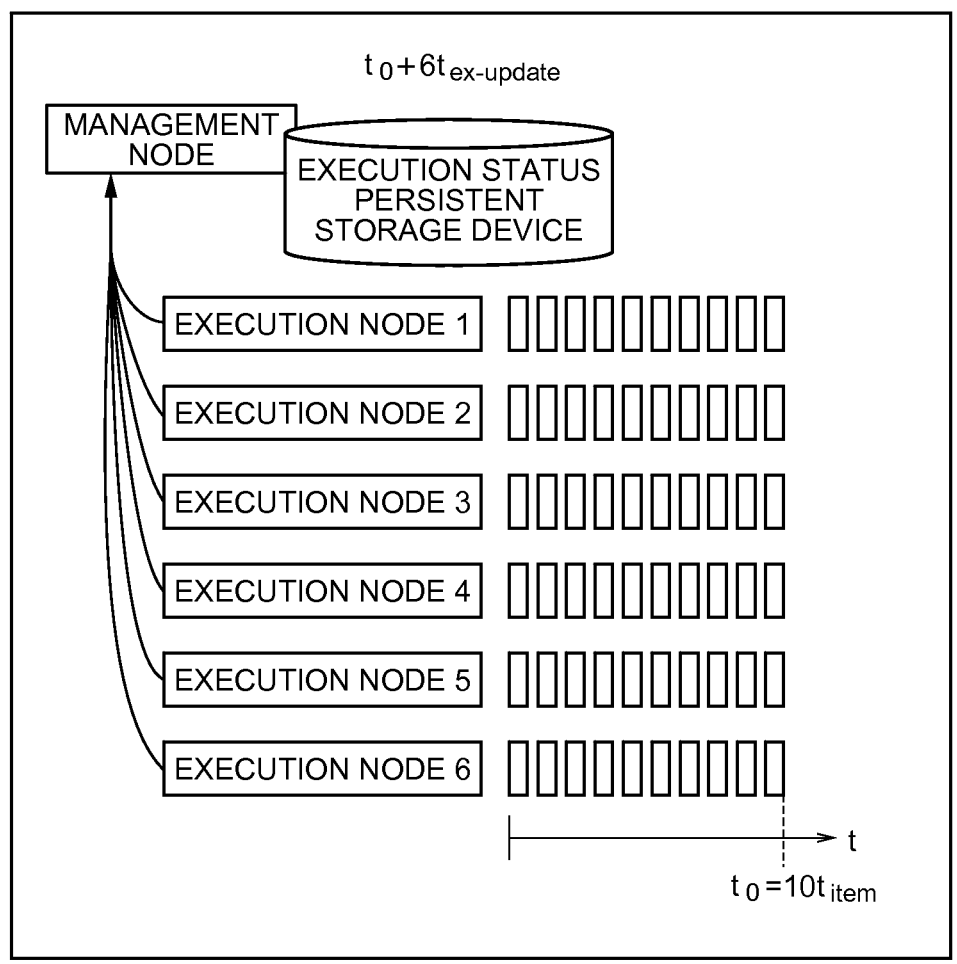
FIG. 14 illustrates the timing of execution status update requests transmitted from execution nodes in the distributed processing system related to the present invention.

FIG. 3 shows the timing when the respective execution nodes 120 transmits the execution status update requests to the management node 110. As the number of items allocated to the execution nodes 120 of the nodes No. 1, No. 2, No. 3, No. 4, No. 5, and No. 6 is different, that is, 6 pieces, 8 pieces, 10 pieces, 11 pieces, 12 pieces, and 13 pieces, the time when the respective execution nodes 120 transmits the execution status update requests to the management node 110 is shifted at least by Δitem. As a result, the multiplicity of the execution status update requests from the execution nodes 120 in management node 110 does not exceed 1, whereby it is possible to temporally distribute the load on the management node 110 associated with the execution status update requests. On the other hand, if the distributed task is allocated equally, as execution status update requests are transmitted from all of the six execution nodes simultaneously at the timing of "time $10*t_{item}$" as shown in FIG. 14, the multiplicity is 6.

As such, according to the present embodiment, execution status update requests will not be transmitted from a number of execution nodes to the management node at the same time, whereby it is possible to temporally distribute the load on the management node associated with the execution status update requests. Consequently, it is possible to reduce request resources in the management node for accepting multiple connections. This provides an advantageous effect that the performance and the scalability of the distributed processing system are improved.

Second Exemplary Embodiment

Figure 4:
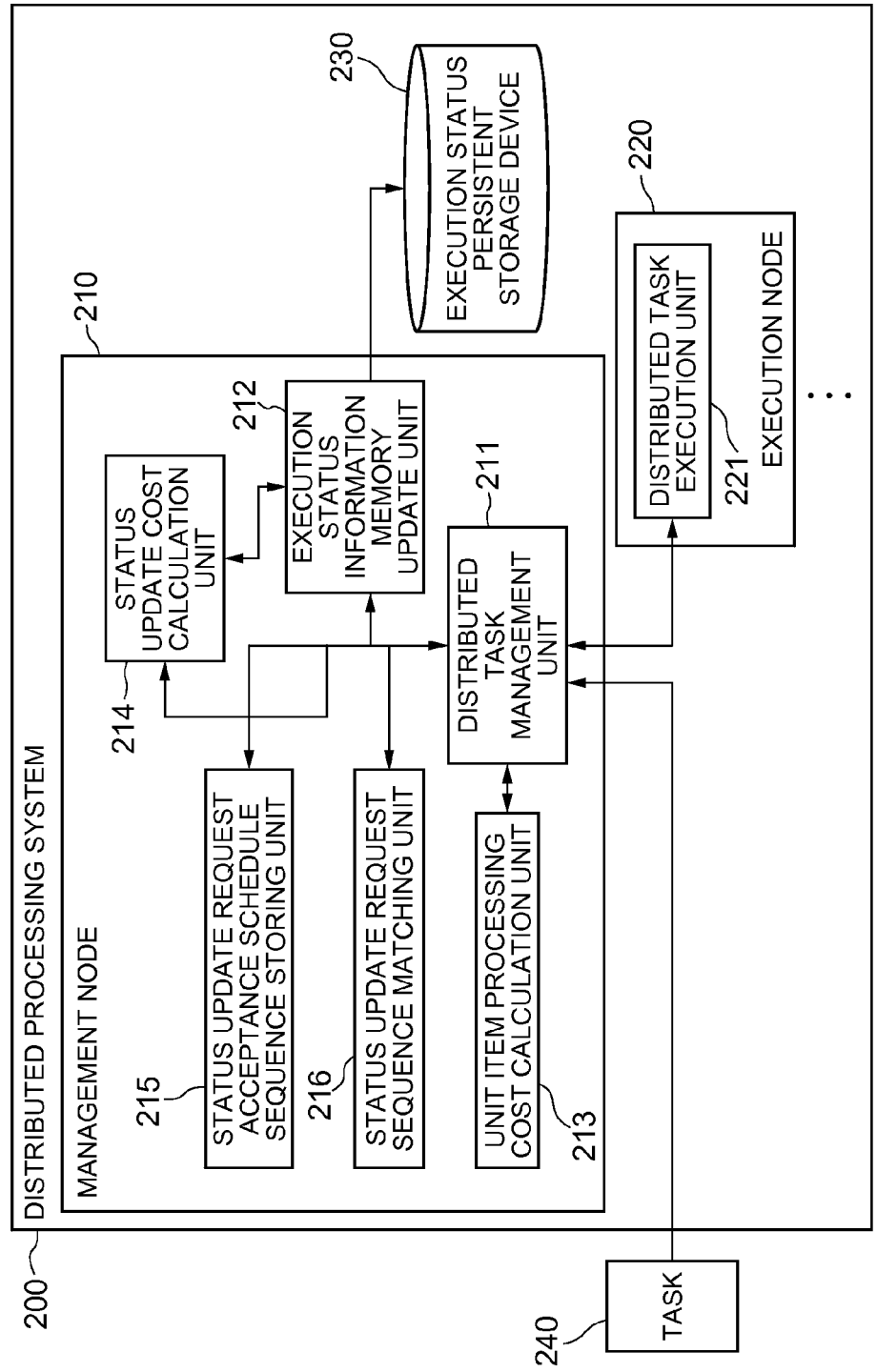
FIG. 4 is a block diagram showing a second exemplary embodiment of the present invention.

Referring to FIG. 4, a distributed processing system 200 according to a second exemplary embodiment of the present invention includes a management node 210, a plurality of execution nodes 220, and an execution status persistent storage device 230. In general, the management node 210 and the respective execution nodes 220 are connected over a network.

The execution node 220, the distributed task management unit 211 therein, and the execution status persistent storage device 230 have the same functions as those of the execution node 120, the distributed task management unit 111 therein, and the execution status persistent storage device 130 in the first exemplary embodiment shown in FIG. 1.

The management node 210 is configured of a computer including a processor such as an MPU, a memory unit such as a ROM and RAM, a communication unit such as a network interface card, an operation input unit such as a keyboard, and a screen display unit such as a liquid crystal display, for example. The memory unit has a program stored therein, and the processor reads and executes the program so as to allow the hardware and the program to cooperate with each other to implement the various processing units. The main processing units implemented by the processor include a distributed task management unit 211, an execution status information memory update unit 212, a unit item processing cost calculation unit 213, a status update cost calculation unit 214, a status update request acceptance schedule sequence storing unit 215, and a status update request sequence matching unit 216.

The execution status information memory update unit 212, the unit item processing cost calculation unit 213, and the status update cost calculation unit 214 have the same functions as those of the execution status information memory update unit 112, the unit item processing cost calculation unit 113, and the status update cost calculation unit 114 of the first exemplary embodiment shown in FIG. 1.

The status update request acceptance schedule sequence storing unit 215 has a function of storing an acceptance schedule sequence of execution status update requests from the execution nodes 220.

The status update request sequence matching unit 216 has a function of matching the acceptance sequence of execution status update requests from the execution nodes 220 in the distributed task management unit 211 against the acceptance schedule sequence of execution status update requests from the execution nodes 220 stored in the status update request acceptance schedule sequence storing unit 215, and detecting, as an abnormal node, any of the execution nodes 220 in which the execution status update request was not accepted although the acceptance sequence has been scheduled.

The distributed task management unit 211 has the same function as that of the distributed task management unit 111 in the first exemplary embodiment shown in FIG. 1, and also has the following functions. When allocating a task to the respective execution nodes 220, the distributed task management unit 211 first stores the magnitude sequence of allocated amounts of the number of unit items as the execution status update request acceptance schedule sequence of the respective execution nodes 220, in the status update request acceptance schedule sequence storing unit 215. In this step, if the allocated amounts of the number of unit items are calculated according to Expression 1 and Expression 2, the magnitude sequence of the allocated amounts of the number of unit items is a sequence of node numbers. Further, when the distributed task management unit 211 accepts an execution status update request from the execution node 220 after the task execution has started, the distributed task management unit 211 transmits the request to the execution status information memory update unit 212, and also transmits the request to the status update request sequence matching unit 216.

Next, operation of the distributed processing system according to the present embodiment will be described. The operation of the present embodiment is similar to that of the first exemplary embodiment, except that the operations of the distributed task management unit 211, the status update request acceptance schedule sequence storing unit 215, and the status update request sequence matching unit 216 differ from the operations of the first exemplary embodiment shown in FIG. 1. Hereinafter, description will be mainly given on the operations which are different from those of the first exemplary embodiment.

In FIG. 4, when a task 240 is submitted, the distributed task management unit 211 of the management node 210 calculates the number of items to be allocated to the respective execution nodes 220 with use of Expression 1 and Expression 2 described above, allocates processing of the calculated number of items as a distributed task, and requests the respective execution nodes 220 to execute the distributed task, in the same manner as in the first exemplary embodiment. In this step, the distributed task management unit 211 stores the magnitude sequence of the numbers of allocated items in the status update request acceptance schedule sequence storing unit 215 as a status update request acceptance schedule sequence of the respective execution nodes 220.

Then, processing of the distributed task is executed by the distributed task execution units 221 of the respective execution nodes 220, and execution status update requests are sequentially transmitted to the management node 210 from the execution nodes 220 which completed the processing of the distributed task. When the distributed task management unit 211 receives an execution status update request from any of the execution nodes 220, the distributed task management unit 211 transmits it to the execution status information memory update unit 212, and also transmits it to the status update request sequence matching unit 216. The execution status information memory update unit 212 performs the same operation as that performed by the execution status information memory update unit 112 in the first exemplary embodiment.

Meanwhile, the status update request sequence matching unit 216 matches the acceptance sequence of the execution status update request from the execution node 220 received from the distributed task management unit 211, against the acceptance schedule sequence of the execution status update requests from the execution nodes 220 stored in the status update request acceptance schedule sequence storing unit 215. Then, if there is any execution node 220 in which the execution status update request was not accepted although the acceptance sequence has been scheduled, the status update request sequence matching unit 216 detects such an execution node 220 as an abnormal node. For example, in the case where the acceptance schedule sequence is an execution node 220-1, an execution node 220-2, and an execution node 220-3, if an execution status update request accepted following acceptance of the execution status update request from the execution node 220-1 is one from the execution node 220-3, the execution node 220-2 is detected as an abnormal node.

An operation when an abnormal node is detected is optional. For example, the status update request sequence matching unit 216 may notify the execution status information memory update unit 212 of the detected abnormal node via the distributed task management unit 211, and the execution status information memory update unit 212 may store information relating to the abnormal node in the execution status persistent storage device 230. Alternatively, the status update request sequence matching unit 216 may notify an outside device, connected over a communication network, of the detected abnormal node.

As described above, according to the present embodiment, an abnormality in the execution nodes can be detected at an earlier stage by using the fact that the completion time of the distributed task in the execution nodes is lined up in the magnitude sequence of the amounts of allocated task of the execution nodes.

Third Exemplary Embodiment

Figure 5:
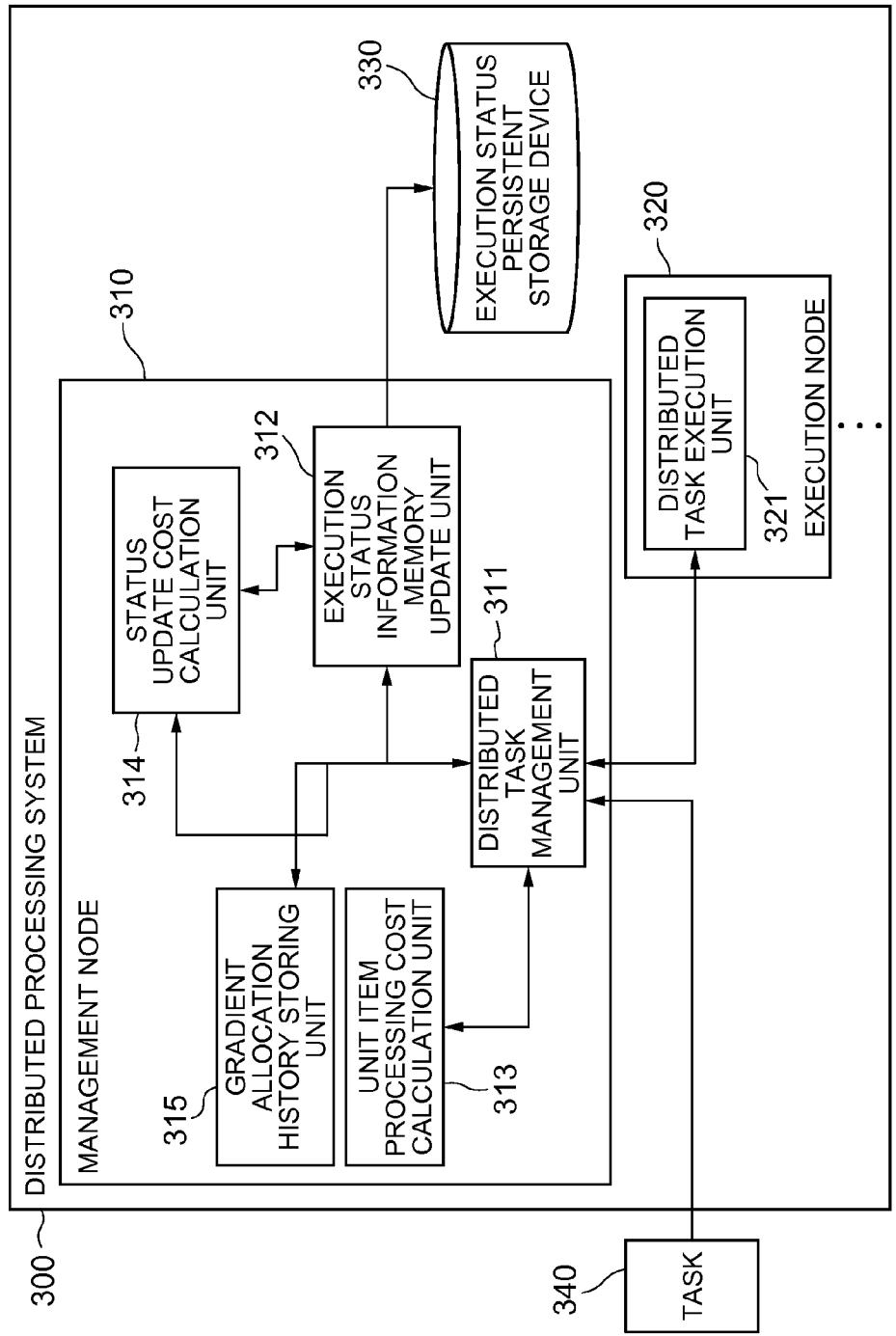
FIG. 5 is a block diagram showing a third exemplary embodiment of the present invention.

Referring to FIG. 5, a distributed processing system 300 according to a third exemplary embodiment of the present invention includes a management node 310, a plurality of execution nodes 320, and an execution status persistent storage device 300. In general, the management node 310 and the respective execution nodes 320 are connected over a network.

The execution node 320, the distributed task management unit 311 therein, and the execution status persistent storage device 330 have the same functions as those of the execution node 120, the distributed task management unit 111 therein, and the execution status persistent storage device 130 in the first exemplary embodiment shown in FIG. 1.

The management node 310 is configured of a computer including a processor such as an MPU, a memory unit such as a ROM and RAM, a communication unit such as a network interface card, an operation input unit such as a keyboard, and a screen display unit such as a liquid crystal display, for example. The memory unit has a program stored therein, and the processor reads and executes the program so as to allow the hardware and the program to cooperate with each other to implement the various processing units. The main processing units implemented by the processor include a distributed task management unit 311, an execution status information memory update unit 312, a unit item processing cost calculation unit 313, a status update cost calculation unit 314, and a gradient allocation history storing unit 315.

The execution status information memory update unit 312, the unit item processing cost calculation unit 313, and the status update cost calculation unit 314 have the same functions as those of the execution status information memory update unit 112, the unit item processing cost calculation unit 113, and the status update cost calculation unit 114 of the first exemplary embodiment shown in FIG. 1.

The gradient allocation history storing unit 315 has a function of storing a history of allocating a task to the execution nodes 320.

The distributed task management unit 311 has the same function at that of the distributed task management unit 111 in the first exemplary embodiment shown in FIG. 1, and also has the following functions. When allocating a task to the respective execution nodes 320, if there is any difference between the amounts of items to be processed in the task allocated to the respective execution nodes 320, the distributed task management unit 311 first stores the allocation history in the gradient allocation history storing unit 315. Further, when calculating the amounts of items to be processed in the task allocated to the respective execution nodes 320, the distributed task management unit 311 refers to the allocation history stored in the gradient allocation history storing unit 315, and if there is an allocation history in which there is a difference in the amounts of items to be processed in the task allocated to the respective execution nodes 320 (gradient allocation), the distributed task management unit 311 performs uniform allocation rather than gradient allocation, while if there is no gradient allocation history, the distributed task management unit 311 performs gradient allocation. In this example, gradient allocation means allocating different amounts of processing targets to be processed in the task to the respective execution nodes such that a difference in the completion time of the task in any two execution nodes, among the execution nodes, becomes greater than at least $t_{ex-update}$, as described in the first exemplary embodiment.

Next, operation of the distributed processing system according to the present embodiment will be described. The operation of the present embodiment is similar to that of the first exemplary embodiment, except that the operations of the distributed task management unit 311 and the gradient allocation history storing unit 315 differ from the operations in the first exemplary embodiment shown in FIG. 1. Hereinafter, description will be mainly given on the operations which are different from those of the first exemplary embodiment.

In FIG. 5, when a first task 340 is submitted, the distributed task management unit 211 of the management node 310 calculates the number of items to be allocated to the respective execution nodes 320 with use of Expression 1 and Expression 2 described above, allocates processing of the calculated number of items as a distributed task, and requests the respective execution nodes 320 to execute the distributed task, in the same manner as in the first exemplary embodiment. In this step, the distributed task management unit 311 stores a gradient allocation execution history in the gradient allocation history storing unit 315.

Next, when a second task 340 is submitted following the first task 340, as a gradient allocation execution history is stored in the gradient allocation history storing unit 315, the distributed task management unit 311 of the management node 310 allocates the distributed task so as to uniformly use the nodes 320 which execute the distributed processing in order to perform uniform task processing in a distributed manner with respect to the input task 340, rather than performing gradient allocation using Expression 1 and Expression 2. This means that the management node 310 divides the input task uniformly and allocates to the respective execution nodes.

Figure 6:
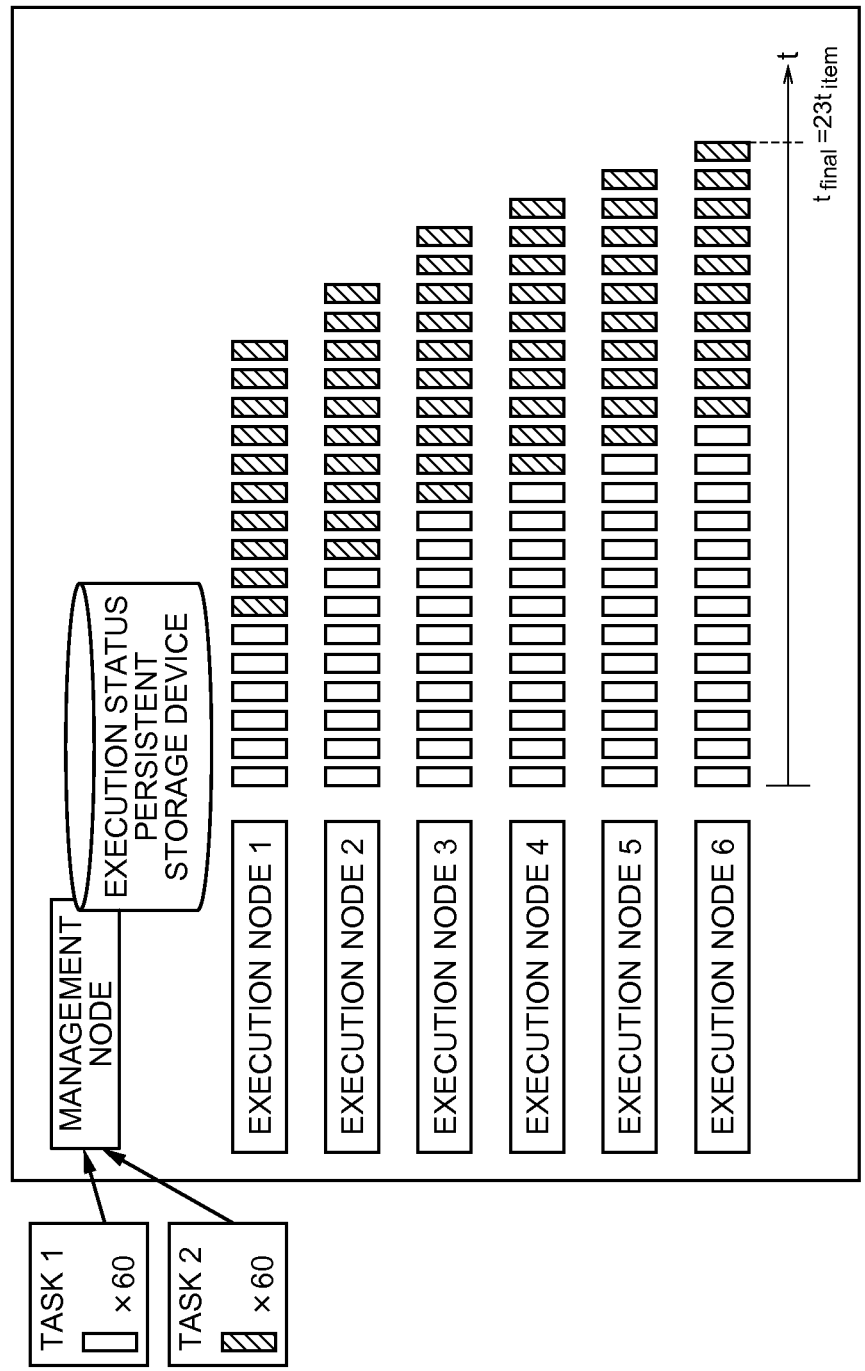
FIG. 6 shows an example of allocating a distributed task to execution nodes in the third exemplary embodiment of the present invention.

FIG. 6 shows an example of distributed task allocation when two tasks 340 are submitted continuously. As the first task 1 was allocated in a gradient manner, even if the following task 2 is allocated uniformly, the task completion time allocated to any two execution nodes 320 differs temporally by at least Δitem. Consequently, the multiplicity of the execution status update requests from the execution nodes 320 in the management node 310 will never exceed 1 in either of the tasks 1 and 2, whereby it is possible to temporally distribute the load on the management node 310 associated with the execution status update requests.

Figure 7:
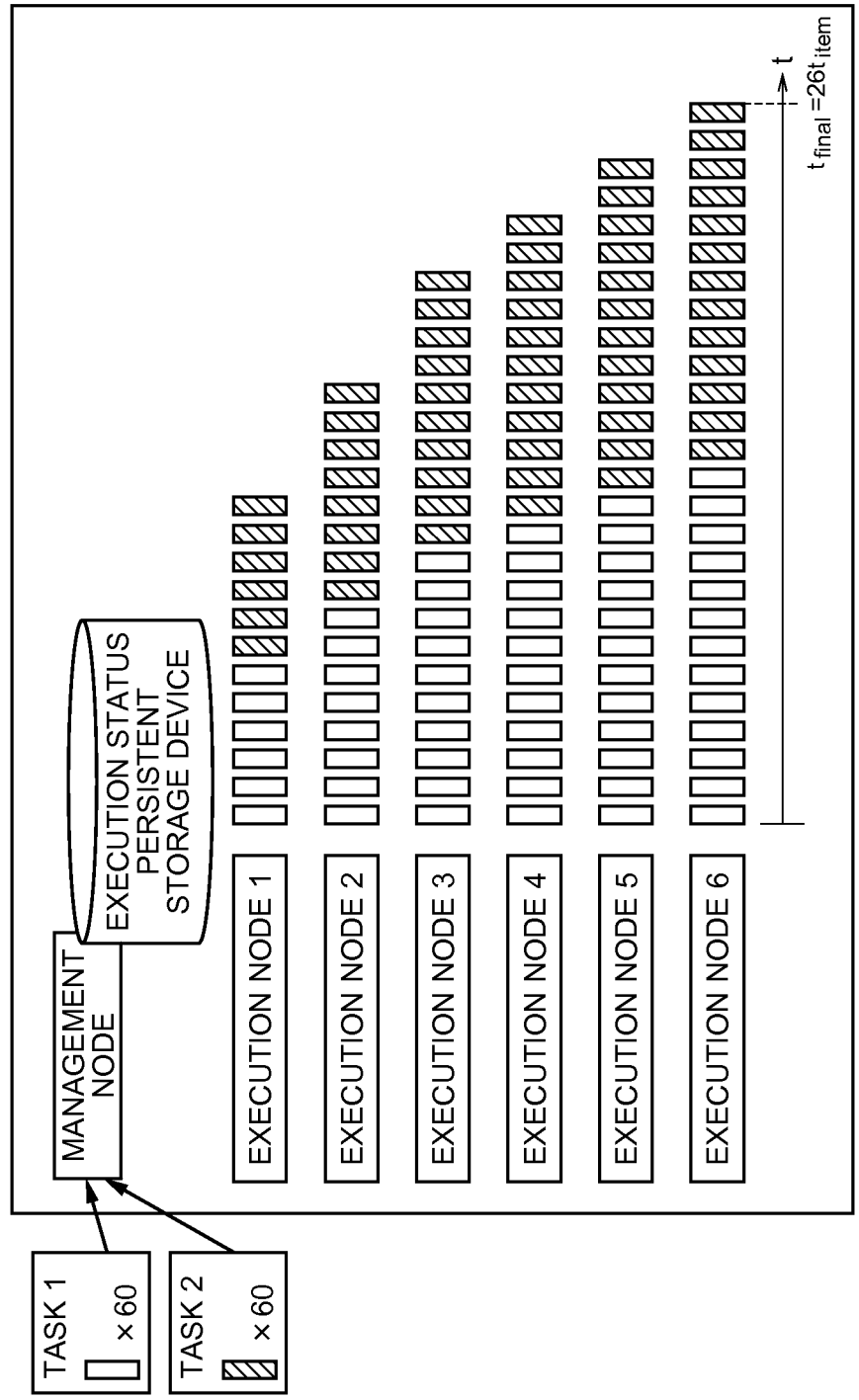
FIG. 7 shows another example of allocation for comparing with the example of allocating a distributed task to execution nodes in the third exemplary embodiment of the present invention.

On the other hand, if the subsequent task 2 is allocated in a gradient manner as the task 1, the distributed task allocation state becomes the one shown in FIG. 7. In FIG. 7, regarding the subsequent task 2, the task completion time of the task allocated to any two execution nodes differs temporally by at least Δitem*2. This means that a time difference, which is twice the least necessary time for avoiding contention of timing of execution status update requests, is caused. As a result, the processing shown in FIG. 7 takes time of 26 $t_{item}$ until the task 2 has been completed. Meanwhile, as the processing shown in FIG. 6 takes time of 23 $t_{item}$ until the task 2 has been completed, processing can be executed more efficiently.

Fourth Exemplary Embodiment

Figure 8:
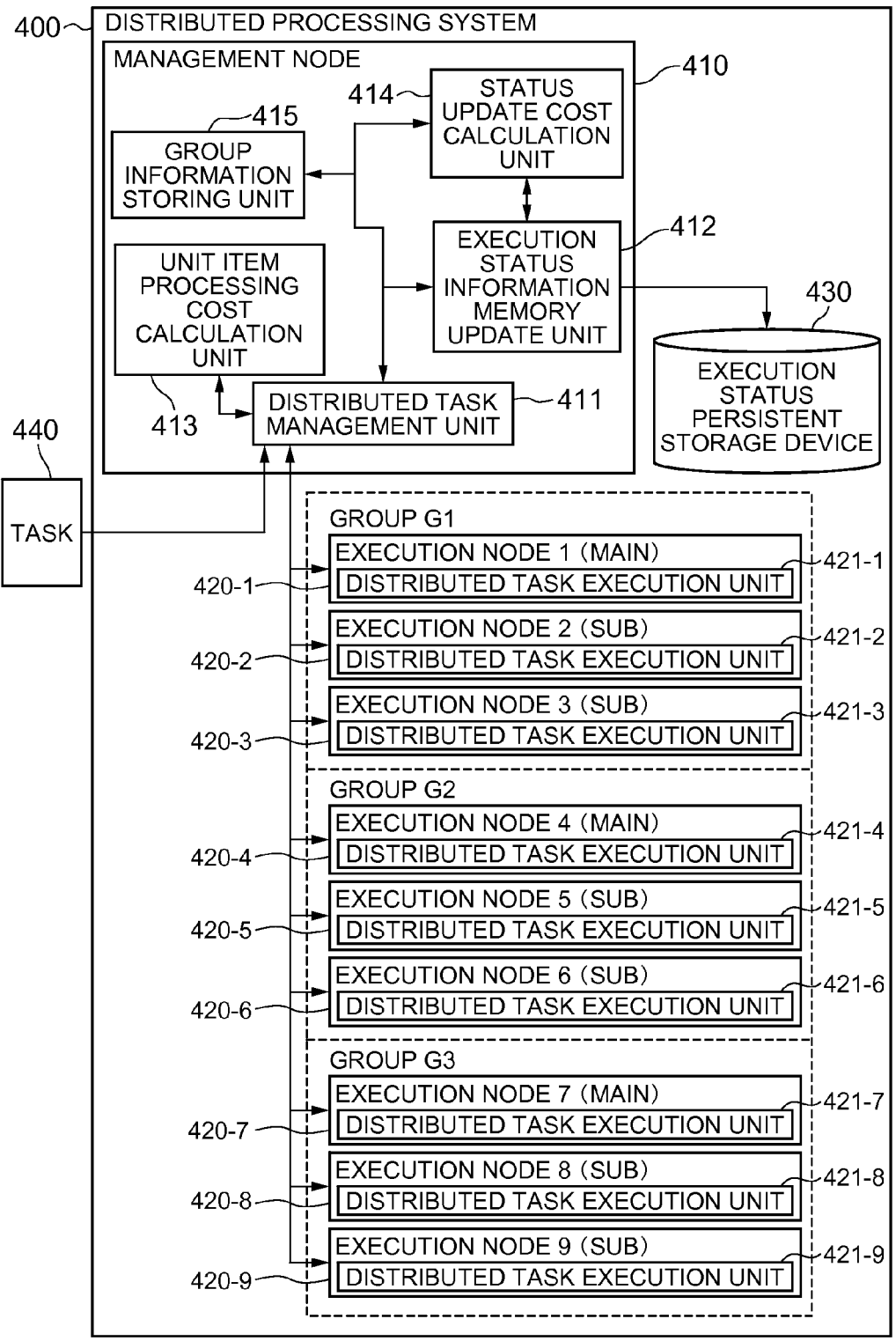
FIG. 8 is a block diagram showing a fourth exemplary embodiment of the present invention.

Referring to FIG. 8, a distributed processing system 400 according to a fourth exemplary embodiment of the present invention includes a management node 410, a plurality of execution nodes 420, and an execution status persistent storage device 430. In general, the management node 410 and the respective execution nodes 420 are connected over a network.

The execution node 420 is configured of a computer including a processor such as an MPU, a memory unit such as a ROM and RAM, a communication unit such as a network interface card, an operation input unit such as a keyboard, and a screen display unit such as a liquid crystal display, for example. The memory unit has a program stored therein, and the processor reads and executes the program so as to allow the hardware and the program to cooperate with each other to implement the various processing units. The main processing units implemented by the processor include a distributed task execution unit 421.

In the present embodiment, the execution nodes 420 are divided into a plurality of groups. Among the execution nodes belonging to each of the groups, one of them works as a main execution node, and the others work as sub execution nodes. In the example shown in FIG. 8, there are nine execution nodes 420 in total, and are divided into three groups in which execution nodes 420-1 to 420-3 constitute a group G1, execution nodes 420-4 to 420-6 constitute a group G2, and execution nodes 420-7 to 420-9 constitute a group G3. In the group G1, the execution node 420-1 works as a main execution node and the execution nodes 420-2 and 420-3 work as sub execution nodes, in the group G2, the execution node 420-4 works as a main execution node and the execution nodes 420-5 and 420-6 work as sub-execution node, and in the group G3, the execution node 420-7 works as a main execution node and the execution nodes 420-8 and 420-9 work as sub-execution nodes.

A distributed task execution unit 421 of a sub-execution node has a function of executing a task allocated by the management node 410, and a function of transmitting an execution status update request, when the execution has been completed, to the main execution node of the own group.

On the other hand, a distributed task execution unit 421 of a main execution node has a function of executing a task allocated by the management node 410, a function of receiving execution status update requests from the sub execution nodes of the own group, and upon completion of execution of the task allocated to the own node and upon reception of the execution status update requests from all of the sub execution nodes, a function of collectively transmitting the execution status update requests of the own node and all of the sub execution nodes to the management node 410.

The management node 410 is configured of a computer including a processor such as an MPU, a memory unit such as a ROM and RAM, a communication unit such as a network interface card, an operation input unit such as a keyboard, and a screen display unit such as a liquid crystal display, for example. The memory unit has a program stored therein, and the processor reads and executes the program so as to allow the hardware and the program to cooperate with each other to implement the various processing units. The main processing units implemented by the processor include a distributed task management unit 411, an execution status information memory update unit 412, a unit item processing cost calculation unit 413, a status update cost calculation unit 414, and a group information storing unit 415.

The execution status information memory update unit 412, the unit item processing cost calculation unit 413, and the status update cost calculation unit 414 have the same functions as those of the execution status information memory update unit 112, the unit item processing cost calculation unit 113, and the status update cost calculation unit 114 of the first exemplary embodiment shown in FIG. 1.

The group information storage section 415 has a function of storing information of the respective groups configured of the execution nodes 420. Information of each of the groups includes information regarding an identifier specifying the main execution node of the group and the like, and information regarding the identifiers specifying the sub execution nodes of the group and the like.

The distributed task management unit 411 has a function of dividing a task 440 submitted to the management node 410 and allocating them to the execution nodes 420, and requesting the execution nodes 420 to execute the distributed task. The distributed task management unit 411 also has a function of, when receiving an execution status update request from any of the execution nodes 420, transmitting the request to the execution status information memory update unit 412 and requesting for processing. Further, when allocating the task, the distributed task management unit 411 has a function of acquiring a time $t_{item}$ from the unit item processing cost calculation unit 413, acquiring a time $t_{ex\text{-}update}$ from the status update cost calculation unit 414, and based on them, determining the amounts of the items to be processed in the task allocated to the respective execution nodes such that a difference in the completion times of the task allocated to any two execution nodes in a group becomes greater than the time $t_{ex\text{-}update}$ and a difference in the completion time of the task allocated to any two main execution nodes becomes greater than $t_{ex\text{-}update}$. Hereinafter, a specific example of a method of calculating the amount of the task to be allocated to each of the execution nodes will be described.

First, the distributed task management unit 411 determines the number of unit items that the processing time thereof equals to the time $t_{ex\text{-}update}$, according to Expression 1 described above.

Next, assuming that the number of the execution nodes is n, the number of groups is g, the total number of unit items which should be processed in the task is m, a group No. is j (0≤j<g), and the number of nodes in a group is s, the distributed task management unit 411 calculates the total amount M(j) of the items to be allocated to the entire group of a group No. j according to the following Expression 3.

$$M(j)=(m/g)+(j-g/2)*s\Delta\text{item} \quad (3)$$

If the total amount of the items calculated according to Expression 3 exceeds "m", an adjustment is made by reducing the excess items from each of the groups such that the total amount becomes "m" In that case, a difference in the total number of items between any groups should not be smaller than Δitem.

Next, the distributed task management unit 411 calculates, for each of the groups, the total amount of items to be allocated to the execution nodes belonging to the group. The calculation is performed in the same manner as Expression 2 in the first exemplary embodiment. As such, assuming that the number of the execution nodes in the group is n', the total number of unit items in the group is m', and the node No. of an execution node in the group is i' (0<i<n, node No. of the main execution node is 1), the distributed task management unit 411 calculates the total amount N'(i) to be allocated to an execution node of the node No. i, according to the following Expression 4.

$$N'(i)=(m'/n')+(i-n'/2)*\Delta\text{item} \quad (4)$$

If the total amount of the items calculated according to Expression 4 exceeds m', an adjustment is made by reducing the excess items such that the total amount becomes m'.

Next, operation of the distributed processing system according to the present embodiment will be described. The operation of the present embodiment is similar to that of the first exemplary embodiment, except that the operations of the distributed task management unit 411 and the distributed task execution unit 421 differ from the operations in the first exemplary embodiment shown in FIG. 1. Hereinafter, description will be mainly given on the operations which are different from those of the first exemplary embodiment.

In FIG. 8, when the task 440 is submitted, the distributed task management unit 411 of the management node 410 refers to the group information storage unit 415, and if a plurality of execution nodes 420 are divided into groups, the distributed task management unit 411 calculates the number of items to be allocated to each of the execution nodes 420 using Expressions 3 and 4 described above, allocates processing of the calculated number of items as a distributed task, and requests each of the execution nodes 420 to execute the distributed task.

Figure 9:
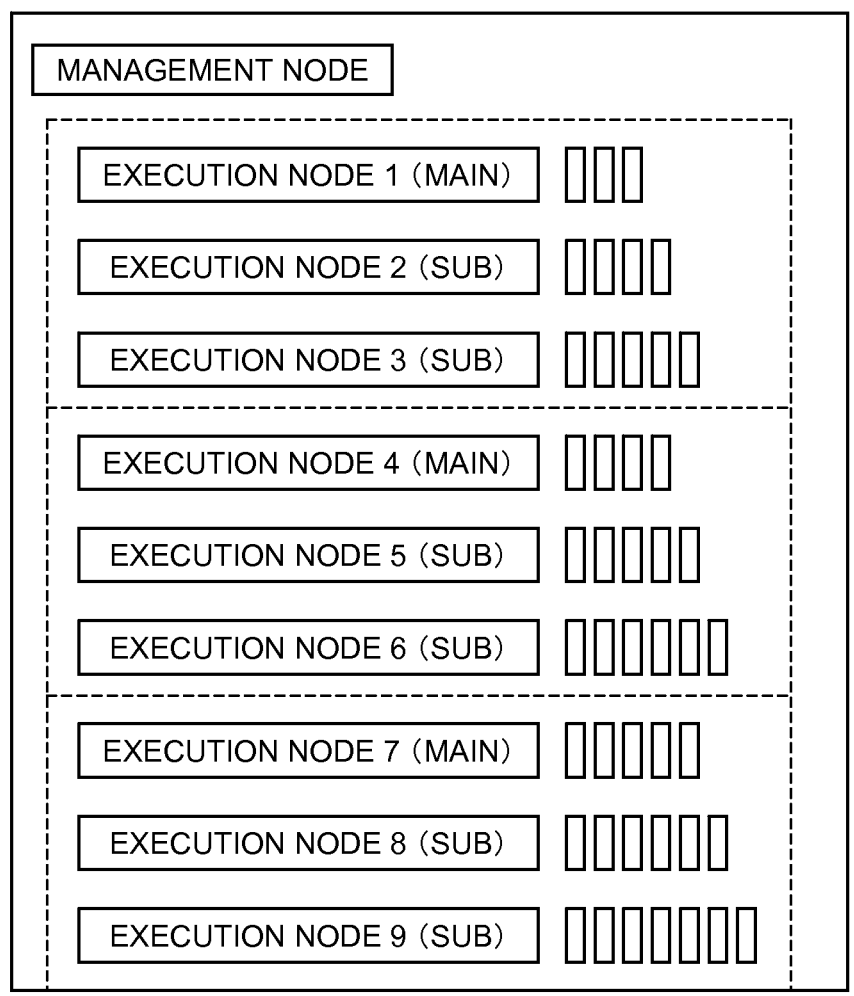
FIG. 9 shows an example of allocating a distributed task to execution nodes in the fourth exemplary embodiment of the present invention.

FIG. 9 shows an example of allocating a distributed task. Referring to FIG. 9, in the case of dividing nine execution nodes into three groups and processing 45 items, 12 items are allocated to the group G1, 15 items are allocated to the group G2, and 18 items are allocated to the group G3. In the group G1, 3 items are allocated to a main execution node 1, 4 items are allocated to a sub execution node 2, and 5 items are allocated to a sub execution node 3. In the group G2, 4 items are allocated to a main execution node 4, 5 items are allocated to a sub execution node 5, and 6 items are allocated to a sub execution node 6. In the group G3, 5 items are allocated to a main execution node 7, 6 items are allocated to a sub execution node 8, and 7 items are allocated to a sub execution node 9.

When the distributed task is allocated, and the distributed task execution unit 421 of each of the execution nodes 420 is requested to execute the distributed task by the management node 410, the distributed task execution unit 421 sequentially executes the respective items of the distributed task. Then, upon completion of processing of all of the items of the distributed task, the distributed task execution unit 421 of a sub execution node transmits an execution status update request to the main execution node of the own group. Then, when the distributed task execution unit 421 of the main execution node completed processing of all of the items of the distributed task allocated to the own node and received the execution status update requests from all of the sub execution nodes of the own group, the distributed task execution unit 421 collectively transmits the execution status update request of the own node and the execution status update requests of the sub execution nodes to the distributed task management unit 411 of the management node 410.

Figure 10:
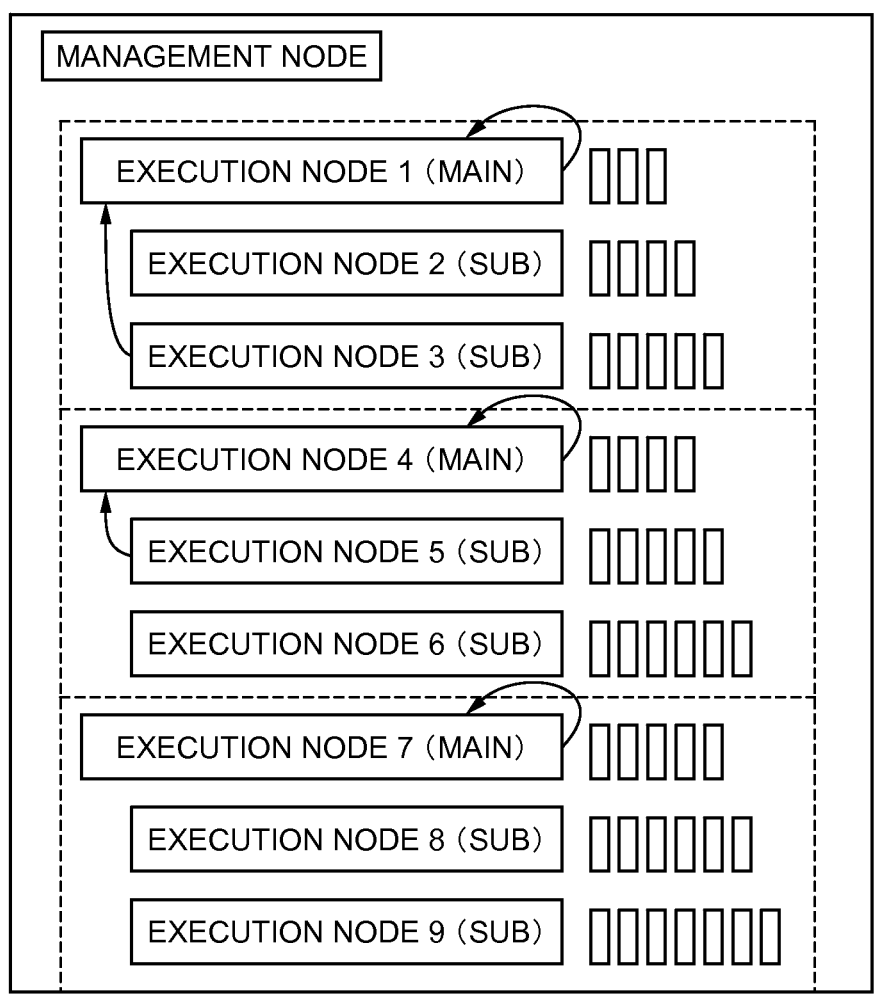
FIG. 10 illustrates the timing of execution status update requests transmitted from the execution nodes in the fourth exemplary embodiment of the present invention.

FIG. 10 illustrates the timing when the respective execution nodes transmit the execution status update requests. Referring to FIGS. 9 and 10, at the point of time $5*t_{item}$, regarding the execution statuses of the sub execution node 2 and the sub execution node 3, an update request is made to the management node 410 together with an update request of the execution status of the main execution node 1 via the execution node 1. However, regarding the execution status of the sub execution node 5 in which processing has been completed at the same time, the execution status is only received by the main execution node 4 of the group to which the node 5 belongs, without a simultaneous access to the management node 410. Similarly, regarding the execution status of the main execution node 7 in which processing is completed at the same time, as an execution status from the sub execution node 9 has not been received, the execution status is held in the own node 7, without a simultaneous access to the management node 410. Accordingly, it is possible to temporally distribute the load on the management node 410 associated with the execution status update requests.

Figure 11:
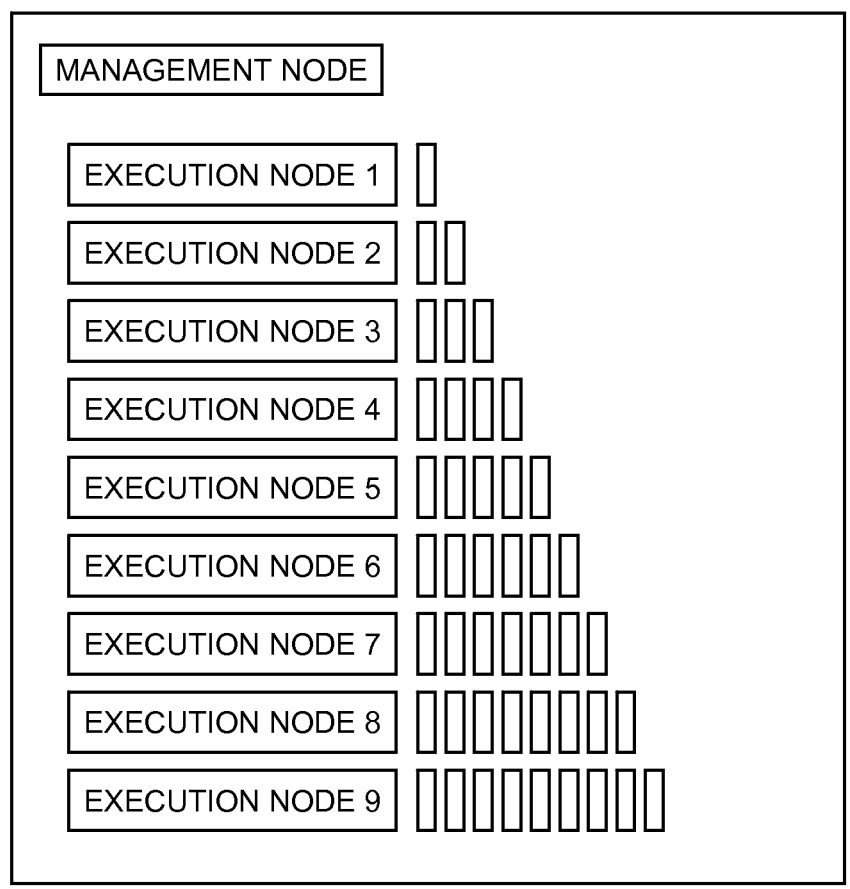
FIG. 11 shows another example of allocation for comparing with the example of allocating a distributed task to execution nodes in the fourth exemplary embodiment of the present invention.
Figure 12:
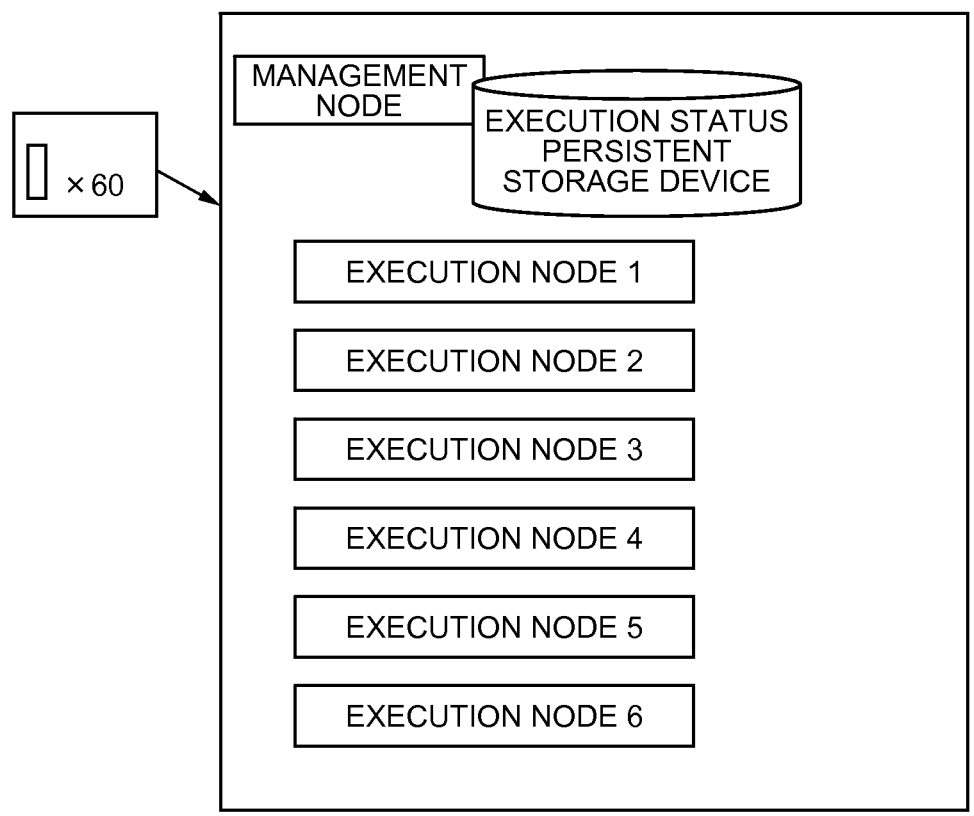
FIG. 12 is a block diagram showing a distributed processing system related to the present invention.
Figure 13:
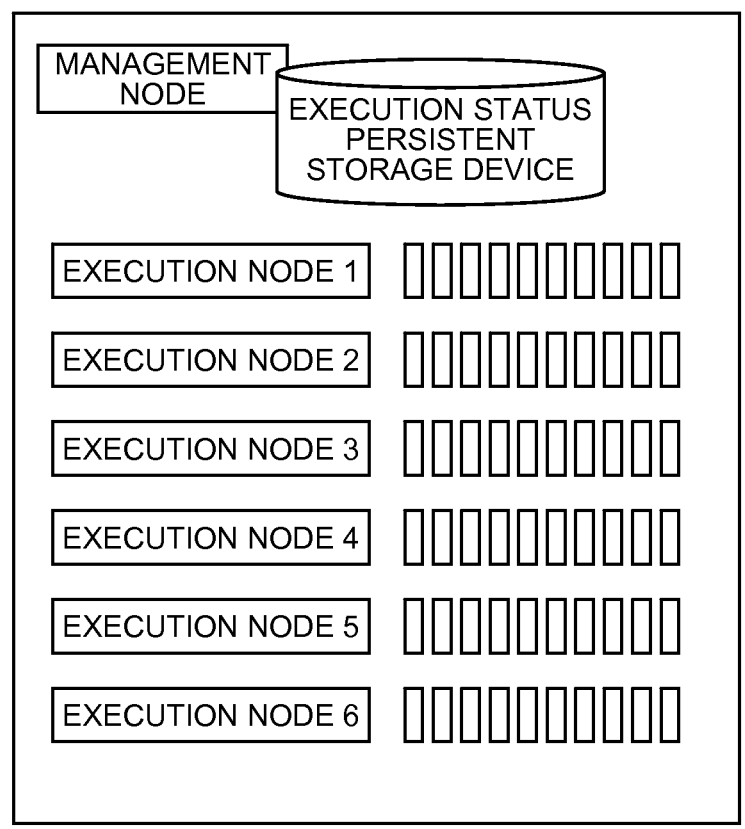
FIG. 13 shows an example of allocating a distributed task to execution nodes in the distributed processing system related to the present invention.

Further, referring to FIG. 10, the number of processing items of the task to which the minimum number of processing items are allocated is 3, while the number of processing items of the task to which the maximum number of processing items are allocated is 7, and the difference between them is 4. On the other hand, if the distributed task is allocated without dividing the execution nodes into groups, the number of processing items of the task to which the minimum number of processing items are allocated is 1, while the number of processing items of the task to which the maximum number of processing items are allocated is 9, and the difference between them is 8, as shown in FIG. 11. Accordingly, in the present embodiment, it is possible to reduce the time during which the calculation resource of the execution node having less number of allocated processing items is in an idle state, whereby distributed processing can be performed efficiently.

Generally, in the case where the execution nodes are not divided into groups, a bias in allocation of the distributed task is increased in proportion to the number of nodes. For example, if the number of execution nodes is n, a difference in the number of processing items between the task to which the minimum number of processing items are allocated and the task to which the maximum number of processing items are allocated is $\Delta item*n$. If n takes a large number such as 1000, as the time during which the calculation resource of the execution node having less number of allocated processing items is in an idle state becomes extremely long, it is ineffective. In contrast, in the case where the execution nodes are divided into groups and the distributed task is allocated, a difference in the number of processing items of the task to which the minimum number of processing items are allocated and the task to which the maximum number of processing items are allocated is generally $\Delta item*n/G$, where the total number of execution nodes is n and the number of groups is G, whereby the difference can be reduced to 1/G.

It should be noted that while an example in which the groups in only one layer has been described in the present embodiment, it is possible to use layered groups and arrange main execution nodes in a tree structure.

While the present invention has been described with reference to the exemplary embodiments described above, the present invention is not limited to the above-described embodiments. Various additions and changes can be made therein. For example, the following exemplary embodiments are also included in the present invention.

In the first exemplary embodiment, the distributed task management unit 111 determines the number of units of processing target data allocated to each of the execution nodes 120 such that in any two execution nodes among the execution nodes 120, a difference in the processing time required for processing the processing target data (items) allocated to the two execution nodes becomes greater than $t_{ex-update}$. However, by determining the number of units of processing target data allocated to the respective execution nodes such that in at least two execution nodes 120, a difference in the processing time of the processing target data allocated to the two execution nodes becomes greater than $t_{ex-update}$, it is possible to temporally distribute the load on the management node 110 associated with execution status update requests.

In the fourth exemplary embodiment, the distributed task management unit 411 determines the amount of items to be processed in the task allocated to each of the execution nodes such that a difference in the completion time of the task allocated to any two execution nodes 420 in the group becomes greater than $t_{ex-update}$, and a difference in the completion time of the task allocated to any two main execution nodes becomes greater than $t_{ex-update}$. However, by determining the number of units of processing target data allocated to each of the execution nodes such that in at least two execution nodes 420 having a particular function, that is, a main execution node function, among the execution node 420, a difference in the processing time required for processing the processing target data allocated to the two execution nodes becomes greater than $t_{ex-update}$ it is possible to temporally distribute the load on the management node 410, associated with execution status update requests.

Industrial Applicability

The present invention is applicable to a distributed processing system configured of a management node and a plurality of execution nodes, such as an enterprise batch processing system, for example.

The whole or part of the exemplary embodiments disclosed above can be described as, but not limited to, the following supplementary notes.

(Supplementary Note 1)

A node device connected with a plurality of execution nodes, the node device comprising:

a persistent storage device that stores execution status information of a task including a plurality of units of processing target data;

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner, wherein in the allocation, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

(Supplementary Note 2)

The node device according to supplementary note 1, wherein in the allocation, the distributed task management unit determines the number of the units of processing target data allocated to each of the execution nodes such that in any two execution nodes among the execution nodes, a difference in processing time required for processing the units of processing target data allocated to the two execution nodes becomes greater than the second period of time.

(Supplementary Note 3)

The node device according to supplementary note 2, further comprising:

an acceptance schedule sequence storing unit that stores an execution status update request acceptance schedule sequence of the execution nodes, the sequence being determined based on a magnitude relationship among the numbers of units of processing target data allocated to the respective execution nodes; and a sequence matching unit that matches an acceptance sequence of the execution status update requests from the execution nodes against the execution status update request acceptance schedule sequence stored in the acceptance schedule sequence storing unit, and detects, as an abnormal node, any of the execution nodes in which the execution status update request was not accepted although the acceptance sequence has been scheduled in the execution status update request acceptance schedule sequence.

(Supplementary Note 4)

The node device according to supplementary note 2, further comprising an allocation history storing unit that stores an allocation history of the units of processing target data to the execution nodes, wherein the distributed task management unit determines the number of the units of processing target data to be allocated to each of the execution nodes with reference to the allocation history.

(Supplementary Note 5)

The node device according to supplementary note 1, wherein in the allocation, the distributed task management unit determines the number of the units of processing target data allocated to each of the execution nodes such that in any two execution nodes having a specific function among the execution nodes, a difference in processing time required for processing the units of processing target data allocated to the two execution nodes becomes greater than the second period of time.

(Supplementary Note 6)

A distributed processing system comprising a management node and a plurality of execution nodes, wherein the management node includes:

a persistent storage device that stores execution status information of a task including a plurality of units of processing target data;

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner, and in the allocation, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

(Supplementary Note 7)

The distributed processing system according to supplementary note 6, wherein each of the execution nodes includes a distributed task execution unit that transmits the execution status update request to the management node upon completion of processing executed to the units of processing target data allocated to the own node, and in the allocation, the distributed task management unit determines the number of the units of processing target data allocated to each of the execution nodes such that in any two execution nodes among the execution nodes, a difference in processing time required for processing the units of processing target data allocated to the two execution nodes becomes greater than the second period of time.

(Supplementary Note 8)

The distributed processing system according to supplementary note 7, wherein the management node includes:

an acceptance schedule sequence storing unit that stores an execution status update request acceptance schedule sequence of the execution nodes, the sequence being determined based on a magnitude relationship among the numbers of the units of processing target data allocated to the respective execution nodes; and a sequence matching unit that matches an acceptance sequence of the execution status update requests from the execution nodes against the execution status update request acceptance schedule sequence stored in the acceptance schedule sequence storing unit, and detects, as an abnormal node, any of the execution nodes in which the execution status update request was not accepted although the acceptance sequence has been scheduled in the execution status update request acceptance schedule sequence.

(Supplementary Note 9)

The distributed processing system according to supplementary note 7, wherein the management node includes an allocation history storing unit that stores an allocation history of the units of processing target data to the execution nodes, and the distributed task execution unit determines the number of the units of processing target data to be allocated to each of the execution nodes with reference to the allocation history.

(Supplementary Note 10)

The distributed processing system according to supplementary note 6, wherein the execution nodes are divided into a plurality of groups, and among the execution nodes belonging to each of the groups, one of the execution nodes works as a main execution node and the other execution nodes work as sub execution nodes, each of the sub execution nodes includes a first distributed task execution management unit that upon completion of processing of the units of processing target data allocated to the own node, transmits the execution status update request to the main execution node of the own group, the main execution node includes a second distributed task execution management unit that upon completion of processing of the units of processing target data allocated to the own node and upon reception of the execution status update requests from all of the sub execution nodes of the own group, transmits the execution status update requests of the own node and of the sub execution nodes to the management node, and in the allocation, the distributed task management unit determines the number of the units of processing target data allocated to each of the execution nodes such that in any two main execution nodes among the main execution nodes, a difference in processing time required for processing the units of processing target data allocated to the two main execution nodes becomes greater than the second period of time.

(Supplementary Note 11)
A distributed processing method implemented by a distributed processing system including a management node and a plurality of execution nodes, the management node including a persistent storage device that stores execution status information of a task including a plurality of units of processing target data, the method comprising:

by the management node, allocating the units of processing target data to the execution nodes in a distributed manner;

by each of the execution nodes, transmitting an execution status update request including an execution result upon completion of processing executed to the units of processing target data allocated to the own node; and by the management node, receiving the execution status update request, and updating the execution status information stored in the persistent storage device, wherein the allocating by the management node includes, based on a first period of time required for processing the units of processing target data by each of the execution nodes and a second period of time required for processing the execution status update request by the management node, determining the number of the units of processing target data allocated to each of the execution nodes such that in at least two execution nodes among the execution nodes, a difference in processing time required for processing the units of processing target data allocated to the two execution nodes becomes greater than the second period of time.

(Supplementary Note 12)
The distributed processing method according to supplementary note 11, wherein the transmitting the execution status update request by each of the execution nodes includes transmitting the execution status update request to the management node upon completion of processing executed to the units of processing target data allocated to the own node, and the allocating by the management node includes determining the number of the units of processing target data allocated to each of the execution nodes such that in any two execution nodes among the execution nodes, a difference in processing time required for processing the units of processing target data allocated to the two execution nodes becomes greater than the second period of time.

(Supplementary Note 13)
The distributed processing method according to supplementary note 12, further comprising by the management node, storing an execution status update request acceptance schedule sequence of the execution nodes, the sequence being determined based on a magnitude relationship among the numbers of the units of processing target data allocated to the respective execution nodes, matching an acceptance sequence of the execution status update requests from the execution nodes against the execution status update request acceptance schedule sequence stored in the acceptance schedule sequence storing unit, and detecting, as an abnormal node, any of the execution nodes in which the execution status update request was not accepted although the acceptance sequence has been scheduled in the execution status update request acceptance schedule sequence.

(Supplementary Note 14)
The distributed processing method according to supplementary note 12, further comprising by the management node, storing an allocation history of the units of processing target data to the execution nodes, and determining the number of the units of processing target data to be allocated to each of the execution nodes with reference to the allocation history.

(Supplementary Note 15)
The distributed processing method according to supplementary note 11, wherein the execution nodes are divided into a plurality of groups, and among the execution nodes belonging to each of the groups, one of the execution nodes works as a main execution node and the other execution nodes work as sub execution nodes, each of the sub execution nodes transmits the execution status update request to the main execution node of the own group upon completion of processing of the units of processing target data allocated to the own node, the main execution node transmits, upon completion of processing of the units of processing target data allocated to the own node and upon reception of the execution status update requests from all of the sub execution nodes of the own group, the execution status update requests of the own node and of the sub execution nodes to the management node, and the allocating by the management node includes determining the number of the units of processing target data allocated to each of the execution nodes such that in any two main execution nodes among the main execution nodes, a difference in processing time required for processing the units of processing target data allocated to the two main execution nodes becomes greater than the second period of time.

(Supplementary Note 16)
A control method implemented by the node device which is connected with a plurality of execution nodes, the node device including a persistent storage device that stores execution status information of a task including a plurality of units of processing target data, the method comprising:

allocating the units of processing target data to the execution nodes in a distributed manner; and receiving an execution status update request including an execution result regarding the units of processing target data from each of the execution nodes and updating the execution status information stored in the persistent storage device, wherein the allocating includes, based on a first period of time required for processing the units of processing target data by each of the execution nodes and a second period of time required for processing the execution status update request by the management node, determining the number of the units of processing target data allocated to each of the execution nodes such that in at least two execution nodes among the execution nodes, a difference in processing time required for processing the units of processing target data allocated to the two execution nodes becomes greater than the second period of time.

(Supplementary Note 17)
The control method of the node device according to supplementary note 16, wherein the allocating includes determining the number of the units of processing target data allocated to each of the execution nodes such that in any two execution nodes among the execution nodes, a difference in processing time required for processing the units of processing target data allocated to the two execution nodes becomes greater than the second period of time.

(Supplementary Note 18)
The control method of the node device according to supplementary note 17, further comprising storing an execution status update request acceptance schedule sequence of the execution nodes, the sequence being determined based on a magnitude relationship among the numbers of the units of processing target data allocated to the respective execution nodes, and matching an acceptance sequence of the execution status update requests from the execution nodes against the execution status update request acceptance schedule sequence stored in the acceptance schedule sequence storing unit, and detecting, as an abnormal node, any of the execution nodes in which the execution status update request was not accepted although the acceptance sequence has been scheduled in the execution status update request acceptance schedule sequence.

(Supplementary Note 19)

The control method of the node device according to supplementary note 17, further comprising storing an allocation history of the units of processing target data with respect to the execution nodes, wherein the allocating includes determining the number of the units of processing target data to be allocated to each of the execution nodes with reference to the allocation history.

(Supplementary Note 20)

The control method of the node device according to supplementary note 16, the allocating includes determining the number of the units of processing target data allocated to each of the execution nodes such that in any two execution nodes having a specific function among the execution nodes, a difference in processing time required for processing the units of processing target data allocated to the two execution nodes becomes greater than the second period of time.

(Supplementary Note 21)

A program for causing a computer to function as, the computer being connected with a plurality of execution nodes and including a persistent storage device that stores execution status information of a task including a plurality of units of processing target data:

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner, wherein in the allocation, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

(Supplementary Note 22)

The program according to supplementary note 21, wherein in the allocation, the distributed task management unit determines the number of the units of processing target data allocated to each of the execution nodes such that in any two execution nodes among the execution nodes, a difference in processing time required for processing the units of processing target data allocated to the two execution nodes becomes greater than the second period of time.

(Supplementary Note 23)

The program, according to supplementary note 22, further causing the computer to function as a sequence matching unit that matches an acceptance sequence of the execution status update requests from the execution nodes, the sequence being determined based on a magnitude relationship among the numbers of units of processing target data allocated to the respective execution nodes, against the execution status update request acceptance schedule sequence stored in the acceptance schedule sequence storing unit, and detects, as an abnormal node, any of the execution nodes in which the execution status update request was not accepted although the acceptance sequence has been scheduled in the execution status update request acceptance schedule sequence.

(Supplementary Note 24)

The program according to supplementary note 22, wherein the distributed task execution unit determines the number of the units of processing target data to be allocated to each of the execution nodes with reference to an allocation history of the units of processing target data to the execution nodes.

(Supplementary Note 25)

The program according to supplementary note 21, wherein in the allocation, the distributed task management unit determines the number of the units of processing target data allocated to each of the execution nodes such that in any two execution nodes having a specific function among the execution nodes, a difference in processing time required for processing the units of processing target data allocated to the two execution nodes becomes greater than the second period of time.

The invention claimed is:

1. A node device connected with a plurality of execution nodes, the node device comprising:

a persistent storage device that stores execution status information of a task including a plurality of units of processing target data;

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner, wherein each of the execution nodes transmits an execution status update request including an execution result upon completion of processing executed to the units of processing target data allocated to the respective execution node of the execution nodes; and in the allocation, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

2. The node device according to claim 1, further comprising:

an acceptance schedule sequence storing unit that stores an execution status update request acceptance schedule sequence of the execution nodes, the sequence being determined based on a magnitude relationship among the numbers of the units of processing target data allocated to the respective execution nodes; and a sequence matching unit that matches an acceptance sequence of the execution status update requests from the execution nodes against the execution status update request acceptance schedule sequence stored in the acceptance schedule sequence storing unit, and detects, as an abnormal node, any of the execution nodes in which the execution status update request was not accepted although the acceptance sequence has been scheduled in the execution status update request acceptance schedule sequence.

3. The node device according to claim 1, further comprising an allocation history storing unit that stores an allocation history of the units of processing target data to the execution nodes, wherein the distributed task management unit determines the number of the units of processing target data to be allocated to each of the execution nodes with reference to the allocation history.

4. The node device according to claim 1, wherein in the allocation, the distributed task management unit determines the number of the units of processing target data allocated to each of the execution nodes such that in any two execution nodes having a specific function among the execution nodes, a difference in processing time required for processing the units of processing target data allocated to the two execution nodes becomes greater than the second period of time.

5. A distributed processing system comprising a management node and a plurality of execution nodes, wherein the management node includes:

a persistent storage device that stores execution status information of a task including a plurality of units of processing target data;

an execution status information memory update unit that receives an execution status update request including an execution result regarding the units of processing target data from each of the execution nodes, and updates the execution status information stored in the persistent storage device; and a distributed task management unit that allocates the units of processing target data to the execution nodes in a distributed manner, each of the execution nodes transmits an execution status update request including an execution result upon completion of processing executed to the units of processing target data allocated to the respective execution node of the execution nodes; and in the allocation, based on a first period of time required for processing the units of processing target data by each of the execution nodes and a second period of time required for processing the execution status update request by the execution status information memory update unit, the distributed task management unit determines the number of the units of processing target data allocated to each of the execution nodes such that in at least two execution nodes among the execution nodes, a difference in processing time required for processing the units of processing target data allocated to the two execution nodes becomes greater than the second period of time.

6. The distributed processing system according to claim 5, wherein the management node includes:

an acceptance schedule sequence storing unit that stores an execution status update request acceptance schedule sequence of the execution nodes, the sequence being determined based on a magnitude relationship among the numbers of the units of processing target data allocated to the respective execution nodes; and a sequence matching unit that matches an acceptance sequence of the execution status update requests from the execution nodes against the execution status update request acceptance schedule sequence stored in the acceptance schedule sequence storing unit, and detects, as an abnormal node, any of the execution nodes in which the execution status update request was not accepted although the acceptance sequence has been scheduled in the execution status update request acceptance schedule sequence.

7. The distributed processing system according to claim 5, wherein the management node includes an allocation history storing unit that stores an allocation history of the units of processing target data to the execution nodes, and the distributed task management unit determines the number of the units of processing target data to be allocated to each of the execution nodes with reference to the allocation history.

8. The distributed processing system according to claim 5, wherein the execution nodes are divided into a plurality of groups, and among the execution nodes belonging to each of the groups, one of the execution nodes works as a main execution node and the other execution nodes work as sub execution nodes, each of the sub execution nodes includes a first distributed task execution management unit that upon completion of processing of the units of processing target data allocated to the respective sub execution node of the sub execution nodes, transmits the execution status update request to the main execution node of the own group, the main execution node includes a second distributed task execution management unit that upon completion of processing of the units of processing target data allocated to the main execution node and upon reception of the execution status update requests from all of the sub execution nodes of the own group, transmits the execution status update requests of the main execution node and of the sub execution nodes to the management node, and in the allocation, the distributed task management unit determines the number of the units of processing target data allocated to each of the execution nodes such that in any two main execution nodes among the main execution nodes, a difference in processing time required for processing the units of processing target data allocated to the two main execution nodes becomes greater than the second period of time.

9. A distributed processing method implemented by a distributed processing system including a management node and a plurality of execution nodes, the management node including a persistent storage device that stores execution status information of a task including a plurality of units of processing target data, the method comprising:

by the management node, allocating the units of processing target data to the execution nodes in a distributed manner;

by each of the execution nodes, transmitting an execution status update request including an execution result upon completion of processing executed to the units of processing target data allocated to the respective execution node of the execution nodes; and by the management node, receiving the execution status update request, and updating the execution status information stored in the persistent storage device, wherein the allocating by the management node includes, based on a first period of time required for processing the units of processing target data by each of the execution nodes and a second period of time required for processing the execution status update request by the management node, determining the number of the units of processing target data allocated to each of the execution nodes such that in at least two execution nodes among the execution nodes, a difference in processing time required for processing the units of processing target data allocated to the two execution nodes becomes greater than the second period of time.

10. The distributed processing method according to claim 9, further comprising by the management node, storing an execution status update request acceptance schedule sequence of the execution nodes, the sequence being determined based on a magnitude relationship among the numbers of the units of processing target data allocated to the respective execution nodes, matching an acceptance sequence of the execution status update requests from the execution nodes against the execution status update request acceptance schedule sequence stored in the acceptance schedule sequence storing unit, and detecting, as an abnormal node, any of the execution nodes in which the execution status update request was not accepted although the acceptance sequence has been scheduled in the execution status update request acceptance schedule sequence.

11. The distributed processing method according to claim 9, further comprising by the management node, storing an allocation history of the units of processing target data to the execution nodes, and determining the number of the units of processing target data to be allocated to each of the execution nodes with reference to the allocation history.

12. The distributed processing method according to claim 9, wherein the execution nodes are divided into a plurality of groups, and among the execution nodes belonging to each of the groups, one of the execution nodes works as a main execution node and the other execution nodes work as sub execution nodes, each of the sub execution nodes transmits the execution status update request to the main execution node of the own group upon completion of processing of the units of processing target data allocated to the respective sub execution node, the main execution node transmits, upon completion of processing of the units of processing target data allocated to the main execution node and upon reception of the execution status update requests from all of the sub execution nodes of the own group, the execution status update requests of the main execution node and of the sub execution nodes to the management node, and the allocating by the management node includes determining the number of the units of processing target data allocated to each of the execution nodes such that in any two main execution nodes among the main execution nodes, a difference in processing time required for processing the units of processing target data allocated to the two main execution nodes becomes greater than the second period of time.

* * * * *